United States Patent [19]

Stark et al.

[11] 4,043,983

[45] Aug. 23, 1977

[54] ELECTRICALLY-CONDUCTIVE RESINS, AND INTERMEDIATES FOR THEIR PREPARATION

[75] Inventors: Bernard Peter Stark, Stapleford; Michael Robert Thoseby, Cambridge, both of England

[73] Assignee: Ciba-Geigy Corporation, Ardsley, N.Y.

[21] Appl. No.: 715,571

[22] Filed: Jan. 12, 1976

[30] Foreign Application Priority Data

Jan. 22, 1975 United Kingdom .............. 2699/75

[51] Int. Cl.² .................... C08G 59/24; C07D 407/00
[52] U.S. Cl. .................................. 260/65; 260/2 EP; 260/2 N; 260/63 R; 260/348.43; 260/348.59; 260/348.63; 260/348.61; 260/348.64

[58] Field of Search ............. 260/348 R, 2 EP, 63 R, 260/65, 2 N

[56] References Cited

U.S. PATENT DOCUMENTS

| 3,235,569 | 2/1966 | Dissen | 260/348 |
|---|---|---|---|
| 3,678,116 | 7/1972 | Carlson | 260/619 F |

Primary Examiner—Harold D. Anderson
Assistant Examiner—Earl A. Nielsen
Attorney, Agent, or Firm—Vincent J. Cavalieri

[57] ABSTRACT

Thermosettable resin compositions which, when cured, are electrically conducting, comprise an adduct of an aliphatic diglycidyl ether with a haloanilic acid and, as curing agent, an aromatic amine containing at least three hydrogen atoms directly attached to nitrogen atoms which are themselves directly attached to aromatic nuclei.

8 Claims, No Drawings

ELECTRICALLY-CONDUCTIVE RESINS, AND INTERMEDIATES FOR THEIR PREPARATION

DETAILED DISCLOSURE

This invention relates to new epoxide resins, to curable and cured compositions containing such resins, and to the use of such cured compositions as electrical conductors.

It is well known that epoxide resins, i.e., substances containing on average more than one 1,2-epoxide group per molecule, may be cured by reaction with various classes of substances to form cross-linked, infusible, insoluble products having valuable technical properties such as ease of processing. Such products are generally electrically insulating, and have found widespread application for this purpose. However, there are circumstances in which an electrically-conducting or electrically-semiconducting product is desirable.

To impart electrical conductivity to an epoxide resin it is conventional to incorporate a finely-divided conducting filler, such as carbon black or a metallic powder, into the uncured mixture. This practice suffers from several drawbacks. To incorporate evenly the finely-divided solid into a viscous resin is difficult, and requires very careful mixing. The solid is liable to settle out, and so a premix containing the powder would require to be efficiently stirred just before use. Finally, there is the possibility that the incorporated powder would rub off when the cured product is exposed to normal frictional forces. There is therefore a need for an electrically-conducting epoxide resin which, the conductivity being an integral property of the resin itself, does not suffer from the drawbacks previously mentioned.

It has now been found that these requirements may be at least substantially met by use of a novel epoxide resin which is an adduct of an aliphatic diglycidyl ether with a haloanilic acid and, as its curing agent, an aromatic amine containing at least three hydrogen atoms directly attached to nitrogen atoms which are themselves directly attached to aromatic nuclei.

The term "aromatic nuclei" is used in this Specification in its conventional sense to mean ring systems having $(4n + 2)$ $\pi$-electrons, where $n$ is the number of rings. Thus, aromatic heterocyclic nuclei are encompassed as well as benzenoid rings.

Accordingly, one aspect of this invention provides epoxide resins of the general formula I

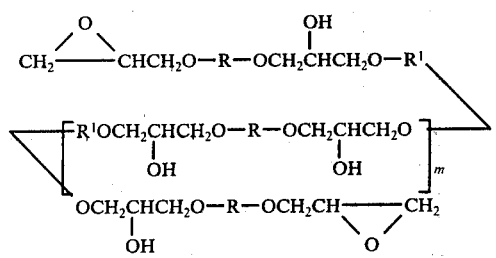

where
each R represents a straight chain or branched alkylene group of from 2 to 30, and preferably from 2 to 12, carbon atoms, which alkylene group may be interrupted in the chain by one or more ether oxygen atoms, by one or more sulphide groups, or by one or more carbonyloxygroups,
each $R^1$ represents a group of formula

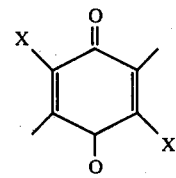

II

X being a halogen atom, especially chlorine or bromine, and $m$ is a positive integer of at most 50, or preferably, zero.

This invention further provides curable compositions comprising an epoxide resin of formula I together with, as curing agent, an aromatic amine having at least three hydrogen atoms directly attached to nitrogen atoms which are themselves attached directly to aromatic nuclei.

Such curable compositions may be cast or applied to other surfaces and allowed or caused to cure. When cured they are electrically conductive. This invention therefore provides an electrically conductive product comprising an epoxide resin of formula I cured with an aromatic amine as hereinbefore specified.

It is believed, although the utility of this invention does not depend on the truth of this belief, that the cured products are strong charge transfer complexes, the amino groups of the curing agent acting as electron donors and the haloanilic acid groups which have undergone reaction acting as electron acceptors.

The compositions of this invention may be used for a variety of purposes, for example, as a surface coating for electrical machine windings, for voltage grading in high voltage insulation, as an antistatic flooring or coating for walls, in electroplating, for cable sheathing, and in other electrical components.

This invention therefore also provides a process for imparting an electrically-conducting finish to an electrically non-conductive article which comprises applying to the article a curable composition of this invention and allowing or causing the composition to cure.

Epoxide resins of formula I are obtainable by the reaction of an aliphatic diglycidyl ether of formula III

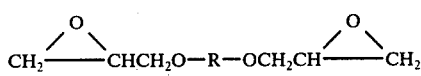

III with a haloanilic acid of formula IV

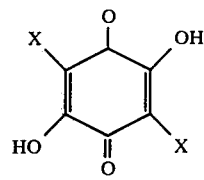

IV where R and X are as hereinbefore defined.

This reaction is preferably effected in a manner conventional for advancement of a diglycidyl ether by means of a dihydric phenol, namely by heating them together in an inert solvent such as dioxan, in the presence of a catalytic amount of an inorganic base (especially sodium hydroxide) or tertiary amine, a quaternary ammonium salt, or a quaternary ammonium base, substantially $(m + 2)$ molar equivalents of the diepoxide III being used per $(m + 1)$ molar equivalents of the haloanilic acid IV, the progress of the reaction being monitored by the decrease in epoxide content. Typically, the diglycidyl ether and haloanilic acid are heated at from 70° to 110° C for from 1 to 8 hours.

Preferred resins of formula I are diglycidyl ethers of straight chain α, ω-alkanediols having from 2 to 6 carbon atoms, which may be interrupted in the chain by one or two ether oxygen atoms, especially propane-1,3-diol, butane-1,4-diol, hexane-1,6-diol, and diethylene glycol. In formula I, therefore, R further preferably represents a polymethylene chain of 2 to 6 carbon atoms, which chain may be interrupted by one or two ether oxygen atoms, and especially $-(CH_2)_3$, $-(CH_2)_4-$, $-(CH_2)_6$, and $-CH_2)_2 O-(CH_2)_2 O-(CH_2)_2-$.

Aromatic amines which may be used as the curing agent are preferably diprimary aromatic amines, especially those wherein the amino groups are directly attached to benzene rings, such as bis(4-aminophenyl)methane, bis(4-aminophenyl) sulphone, bis(4-aminophenyl) ketone, bis(4-amino-3-ethylphenyl)methane, bis(4-aminophenyl) ether, o-, m-. and p-phenylenediamines, but 2,6-diaminopyridine, for example, may also be used, as may substances containing more than two primary aromatic amino groups, such as aniline-formaldehyde resins.

The proportion of the curing agent used will depend on such factors as the epoxide content of the epoxide resin, the nature of the curing agent, the curing conditions and, especially, the mechanical and thermal properties sought in the cured product. Usually from 0.8 to 1.2 aromatic amino-hydrogen equivalents of the curing agent are used per 1,2-epoxide equivalent of the epoxide resin of formula I. Usually, too, curing is carried out by heating the aromatic amine and the epoxide resin at a temperature of from 75° to 175° C for from 2 to 12 hours.

The curable compositions of the present invention may further contain epoxide resins other than those of formula I, and curing agents therefor. Incorporation of such resins may alter the physical properties of the cured product and so, by selection of the components and their proportions, products having a wide range of mechanical, thermal, and electrical properties are obtainable. Such selection is within the routine skill of an epoxide resin technologist.

As examples of epoxide resins which may be incorporated with the resins of formula I may be mentioned polyglycidyl esters obtainable by reaction of a compound containing two or more carboxylic acid groups per molecule with epichlorohydrin or glycerol dichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, and dimerised and trimerised linoleic acid; from cycloaliphatic polycarboxylic acids, such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl ethers obtainable by reaction of a compound containing at least two free alcoholic hydroxyl and/or phenolic hydroxyl groups per molecule with epichlorohydrin or glycerol dichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, pentaerythritol, sorbitol, and poly(epichlorohydrin); from cycloaliphatic alcohols such as resorcitol, quinitol, bis(4-hydroxycyclohexyl)methane, 2,2-bis(4-hydroxycyclohexyl)propane, and 1,1-bis(hydroxymethyl)-cyclohex-3-ene; and from alcohols having aromatic nuclei, such as N,N-bis(2-hydroxyethyl)aniline and p,p'-bis(2-hydroxyethylamino)-diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl) sulphone, 1,1,2,2-tetrakis(4-hydroxyphenyl)ethane, 2,2-bis(4-hydroxyphenyl)propane ( otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert. butylphenol.

Poly(N-glycidyl) compounds which may be incorporated include, for example, those obtained by dehydrochlorination of the reaction products of epichlorohydrin with amines containing at least two amino-hydrogen atoms such as aniline, n-butylamine, bis(4-aminophenyl)methane, and bis(4-methylaminophenyl)methane; triglycidyl isocyanurate; and N,N'- diglycidyl derivatives of cyclic ureas such as ethylenurea and 1,3-propyleneurea and hydantoins such as 5,5-dimethylhydantoin.

Examples of poly(S-glycidyl) compounds which may be incorporated are di-S-glycidyl derivatives of dithiols such as ethane-1,2-dithiol and bis(4-mercaptomethylphenyl) ether.

Other epoxide resins which may be incorporated include bis(2,3-epoxycyclopentyl) ether, 2,3-epoxycyclopentyl glycidyl ether, the N,N, O-triglycidyl derivative of 4-aminophenol, and the glycidyl ether-glycidyl ester of salicylic acid.

Additional curing agents which may be incorporated in the curable compositions of the present invention must be compatible with the aromatic amine curing agent. Acids and acid anhydrides are not therefore envisaged, but known amine curing agents such as aliphatic amines and poly(aminoamides) may be incorporated. The curable compositions may further contain diluents or viscosity-reducing agents for the epoxide resin or the curing agent, such as phenyl glycidyl ether, n-butyl glycidyl ether, and iso-octyl glycidyl ether; they may also contain pigments such as titanium dioxide, plasticising agents such as polypropylene glycols, and flow-control agents.

This invention is illustrated by the following Examples, in which all parts are by weight and temperatures are in degrees Celsius. Volume resistivities quoted are the values at room temperature.

EXAMPLE 1

Chloranilic acid (41.8 g), butane-1,4-diol diglycidyl ether of epoxide content 9.19 equiv./kg (86.8g), dioxan (500 ml), and 10% aqueous sodium hydroxide (0.5 ml) were stirred and heated under reflux for 4 hours. The solution was then filtered and the solvent was evaporated under reduced pressure in a rotary evaporator heated in a water bath to leave a viscous dark red liquid having an epoxide content of 1.82 equiv./kg.

A 25 g portion of this adduct was then heated to 100° and mixed with 2.3 g of bis(4-aminophenyl)methane, also heated to 100°. The mixture was poured into a brass mould of internal dimensions 125 mm × 45 mm × 3 mm and was cured by heating first for 3 hours at 100° and then for 2 hours at 150°. The volume resistivity of the resulting sheet was $7 \times 10^7$ ohm-cm.

EXAMPLE 2

Chloranilic acid (10.45 g), diethylene glycol diglycidyl ether of epoxide content 7.83 equiv./kg (25.5 g), dioxan (125 ml), and 10% aqueous sodium hydroxide (0.1 ml) were heated under reflux with stirring for 4 hours. The solvent was then removed as described in Example 1, there remaining a viscous dark red liquid having an epoxide content of 1.45 equiv./kg.

A 25 g portion of this adduct was then heated to 100° and mixed with 1.85 g of bis(4-aminophenyl)methane, also at 100°. The mixture was poured into a brass mould and cured as described in Example 1. The volume resistivity of the resulting sheet was $1 \times 10^9$ ohm-cm.

EXAMPLE 3

Chloranilic acid (20.9 g), hexane-1,6-diol diglycidyl ether of epoxide content 8.0 equiv./kg (49.7 g), dioxan (250 ml), and 10% aqueous sodium hydroxide (0.2 ml) were stirred and heated under reflux for 3 hours. The solvent was removed as described in Example 1, leaving a dark red viscous liquid having an epoxide content of 1.20 equiv./kg.

A 25 g portion of this adduct was heated to 100° and mixed with 1.53 g of bis(4-aminophenyl)methane, also heated to 100°. The mixture was poured into a brass mould and cured as described in Example 1. The volume resistivity of the resulting sheet was $2 \times 10^8$ ohm-cm.

EXAMPLE 4

Chloranilic acid (20.9 g), propane-1,3-diol diglycidyl ether of epoxide content 9.56 equiv./kg. (41.9 g), dioxan (125 ml), and 10% aqueous sodium hydroxide (0.1 ml) were heated under reflux with stirring for 3 hours, then the solvent was evaporated off as before, leaving a dark red viscous liquid having an epoxide content of 1.16 equiv./kg.

A 25 g sample of this resin was mixed at 100° with 1.5 g of bis(4-aminophenyl)methane, also heated to 100°, and poured into a brass mould and cured as described in Example 1. The volume resistivity of the resulting sheet was $9 \times 10^9$ ohm-cm.

A further 25 g sample of the resin was mixed at 100° with 1.8 g of a commercial mixture of aromatic primary diamines consisting mainly of 3,3'-diethyl-4,4'-diaminodiphenylmethane and 3-ethyl-4,4'-diaminodiphenylmethane. The mixture was poured into a brass mould as described in Example 1 and cured by heating for 4 hours at 100° and 4 hours at 150°. The volume resistivity of the resulting sheet was $7 \times 10^{10}$ ohm-cm.

EXAMPLE 5

Bromanilic acid (14.9 g), butane-1,4-diol diglycidyl ether of epoxide content 9.19 equiv./kg (27 g), dioxan (125 ml), and 10% aqueous sodium hydroxide were heated together under reflux with stirring for 7 hours and then the mixture was allowed to cool overnight. Next day, the mixture was filtered and then stripped of solvent as before, a dark red, viscous liquid of epoxide content 1.64 equiv./kg being left.

A 25 g sample of this adduct at 100° was mixed with 2.1 g of bis(4-aminophenyl)methane, also at 100°, and the mixture was poured into a brass sheet mould and cured as described in Example 1. The volume resistivity of the resulting slightly flexible sheet was $9 \times 10^7$ ohm-cm.

EXAMPLE 6

A mixture of chloranilic acid (20.9g g), decane-1,10-diol diglycidyl ether of epoxide content 5.97 equiv./kg (66.6 g), dioxan (250 ml), and 10% aqueous sodium hydroxide (0.1 ml) was heated to reflux with stirring for 4 hours, filtered, and then stripped of solvent as before.

A 25 g sample of the resultant dark red viscous adduct (epoxide content 1.68 equiv./kg) was heated to 100°, mixed with 2.15 g of bis(4-aminophenyl) methane which had also been heated to 100°, and the composition was cured as described in Example 1. The resultant sheet had a volume resistivity of $4 \times 10^9$ ohm-cm.

EXAMPLE 7

Chloranilic acid (10.45 g), the diglycidyl ether, having an epoxide content of 2.91 equiv.kg, of a poly(oxypropylene) glycol of average molecular weight 425 (68.5 g), dioxan ( 125 ml), and 10% aqueous sodium hydroxide (0.5 ml) were heated together under reflux for 7 hours. Next, the solvent was stripped off as before to leave a dark red liquid of epoxide content 0.91 equiv./kg.

A 25 g sample of this adduct, heated to 100°, was mixed with 1.2 g of bis(4-aminophenyl)methane, also at 100°, and the composition was cured as before but with heating at 100° for 18 hours followed by 2 hours at 150°. The resultant flexible sheet had a volume resistivity of $1 \times 10^7$ ohm-cm.

EXAMPLE 8

The procedure of Example 7 was repeated with 20.9 g of chloranilic acid, 52.4 g of neopentyl glycol diglycidyl ether (epoxide content 7.59 equiv./kg), and 0.5 ml of 10% aqueous sodium hydroxide. The resultant adduct, a viscous red liquid, had an epoxide content of 1.61 equiv./kg.

A 25 g sample was mixed with 2.03 g of bis(4-aminophenyl)methane and cured as described in Example 7, heating for 3 hours at 100° and 2 hours at 150°. The resultant sheet had a volume resistivity of $9 \times 10^{10}$ ohm-cm.

EXAMPLE 9

A further 25 g sample of the adduct prepared in Example I was heated to 100 100° and mixed with 1.3 g of m-phenylenediamine, also heated to 100°, and the composition was cured by heating it in a brass mould for 3 hours at 100° and 2 hours at 150°. The volume resistivity of the resultant sheet was $2 \times 10^9$ ohm-cm.

EXAMPLE 10

A 20g sample of the adduct prepared in Example 1 and 5g of a diglycidyl ether of 2,2-bis(4-hydroxyphenyl) propane having an epoxide content of 5.2 equiv./kg, were mixed and heated to 100°. This mixture was then combined with 3.2g of bis(4-aminophenyl) methane, also heated to 100°, and poured into a brass mould as described in Example 1. The composition was cured by heating for 3 hours at 100° and 2 hours at 150°. The resulting sheet was non-flexible and had a volume resistivity of $6 \times 10^{10}$ ohm-cm.

EXAMPLE 11

The foregoing Examples describe the preparation of adducts of formula I wherein m denotes zero. This Example describes the preparation of an adduct wherein m denotes 1.

A mixture of chloranilic acid (20.9 g), butane-1,4-diol diglycidyl ether of epoxide content 9.19 equiv./kg (40.5 g), dioxan (250 ml), and 10% aqueous sodium hydroxide (0.5 ml) was treated as in Example 7. A 25 g portion of the resultant viscous dark red liquid (epoxide content 0.76 equiv./kg) was mixed with 1.2 g of bis(4-aminophenyl)methane, cast into a cylindrical glass mould, and cured for 3 hours at 100° and 2 hours at 150°. The volume resistivity of the product was $1.4 \times 10^{10}$ ohm-cm.

We claim:

1. Epoxide resins of the general formula

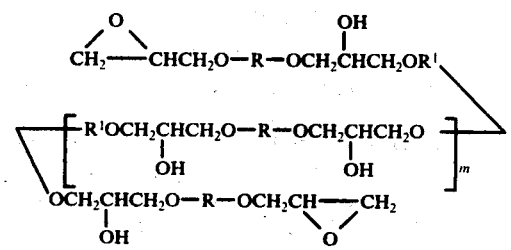

where
each R represents an alkylene hydrocarbon group of from 2 to 30 carbon atoms, an alkylene hydrocarbon group of from 2 to 30 carbon atoms interrupted in the chain by at least one ether oxygen atom, an alkylene hydrocarbon group of from 2 to 30 carbon atoms interrupted in the chain by at least one sulfide group, or an alkylene hydrocarbon group of from 2 to 30 carbon atoms interrupted in the chain by at least one carbonyloxy group, each $R^1$ represents a group of formula

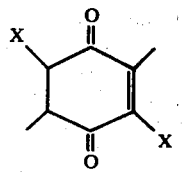

X being a halogen atom, and
m is zero or a positive integer of at most 50.

2. The epoxide resins of claim 1, in which R represents a group containing up to 12 carbon atoms.

3. The epoxide resins of claim 2, in which R represents a polymethylene hydrocarbon chain of 2 to 6 carbon atoms, or a polymethylene hydrocarbon chain interrupted by at least one and at most two ether oxygen atoms.

4. The epoxide resins of claim 1, in which X denotes chlorine or bromine.

5. Curable compositions comprising an epoxide resin as claimed in claim 1 and, as curing agent therefor, an aromatic amine having at least three hydrogen atoms directly attached to nitrogen atoms which are themselves attached directly to aromatic nuclei.

6. The compositions of claim 5, in which the aromatic amine is a diprimary aromatic amine.

7. The compositions of claim 6, in which the amino groups of the diprimary aromatic amine are directly attached to benzene rings.

8. The compositions of claim 5, in which the curing agent provides from 0.8 to 1.2 aromatic amino-hydrogen equivalents per 1,2-epoxide equivalent of the epoxide resin.

* * * * *

UNITED STATES PATENT AND TRADEMARK OFFICE
CERTIFICATE OF CORRECTION

PATENT NO. : 4,043,983
DATED : August 23, 1977
INVENTOR(S) : Bernard Peter Stark and Michael Robert Thoseby It is certified that error appears in the above-identified patent and that said Letters Patent are hereby corrected as shown below:

In the heading, after "Appl. No.:" delete 715,571 and insert therefor --- 648,542 ---.

Column 8, line 10, delete the formula and insert the following new formula ---

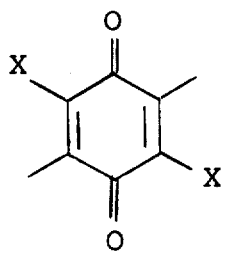

--- .

Signed and Sealed this

Twenty-second Day of November 1977

[SEAL]

Attest:

RUTH C. MASON
Attesting Officer

LUTRELLE F. PARKER
Acting Commissioner of Patents and Trademarks